(12) United States Patent
Ahee et al.

(10) Patent No.: US 8,573,394 B2
(45) Date of Patent: Nov. 5, 2013

(54) ELECTRONIC DEVICE CASE AND METHOD OF USE

(75) Inventors: Anthony Ahee, Grosse Point Shores, MI (US); John M. Schoenith, Hollywood, CA (US)

(73) Assignee: Clamcase, LLC, Troy, MI (US)

( * ) Notice: Subject to any disclaimer, the term of this patent is extended or adjusted under 35 U.S.C. 154(b) by 188 days.

(21) Appl. No.: 13/027,740

(22) Filed: Feb. 15, 2011

(65) Prior Publication Data

US 2011/0147398 A1 Jun. 23, 2011

Related U.S. Application Data

(60) Provisional application No. 61/331,870, filed on May 6, 2010.

(51) Int. Cl.
*B65D 85/00* (2006.01)
*E05D 3/06* (2006.01)
*G06F 1/16* (2006.01)

(52) U.S. Cl.
USPC .......................... 206/320; 16/366; 361/679.27

(58) Field of Classification Search
USPC ........ 206/320, 472; 361/679.27, 683, 679.55, 361/679.56; 16/342, 366; 220/817, 810
See application file for complete search history.

(56) References Cited

U.S. PATENT DOCUMENTS

| | | | |
|---|---|---|---|
| 676,449 A | 6/1901 | Schwarz | |
| 5,594,619 A | 1/1997 | Miyagawa et al. | |
| 5,666,694 A * | 9/1997 | Slow et al. | 16/368 |
| 5,737,183 A | 4/1998 | Kobayashi et al. | |
| 5,987,704 A * | 11/1999 | Tang | 16/354 |
| 6,219,230 B1 * | 4/2001 | Cho | 361/679.55 |
| 6,253,419 B1 * | 7/2001 | Lu | 16/340 |
| 6,304,433 B2 * | 10/2001 | O'Neal et al. | 361/679.27 |
| 6,493,216 B1 * | 12/2002 | Lin | 361/679.27 |
| 6,498,718 B1 * | 12/2002 | Kim et al. | 361/679.58 |
| 6,771,494 B2 * | 8/2004 | Shimano | 361/679.06 |
| 7,484,271 B2 * | 2/2009 | Oshima et al. | 16/366 |
| 7,540,675 B2 * | 6/2009 | Liu | 400/472 |
| 7,730,587 B2 * | 6/2010 | Chang et al. | 16/340 |
| 2001/0040559 A1 | 11/2001 | Bullister | |
| 2002/0159226 A1 | 10/2002 | Huang et al. | |
| 2003/0112590 A1 | 6/2003 | Shimano et al. | |
| 2005/0122671 A1 * | 6/2005 | Homer | 361/681 |
| 2005/0155182 A1 * | 7/2005 | Han et al. | 16/336 |
| 2005/0168925 A1 | 8/2005 | Fang et al. | |
| 2005/0236869 A1 * | 10/2005 | Ka et al. | 296/192 |
| 2006/0007645 A1 * | 1/2006 | Chen et al. | 361/681 |
| 2006/0044288 A1 | 3/2006 | Nakamura et al. | |
| 2006/0264243 A1 * | 11/2006 | Aarras | 455/566 |
| 2007/0091553 A1 * | 4/2007 | Chang | 361/681 |
| 2007/0097087 A1 | 5/2007 | Homer et al. | |
| 2008/0225471 A1 | 9/2008 | Takizawa | |

(Continued)

OTHER PUBLICATIONS

International Search Report & Written Opinion dated Dec. 13, 2011 (PCT/US2011/035310). WO.

(Continued)

*Primary Examiner* — Steven A. Reynolds
(74) *Attorney, Agent, or Firm* — The Dobrusin Law Firm, PC

(57) ABSTRACT

The present invention relates to improved protective cases for hand-held electronic devices. More specifically, the present invention relates to cases that protect and modify the functionality of an electronic device.

5 Claims, 15 Drawing Sheets

(56) References Cited

U.S. PATENT DOCUMENTS

| | | |
|---|---|---|
| 2009/0000062 A1* | 1/2009 | Yamanami ................... 16/366 |
| 2009/0056073 A1* | 3/2009 | Lin ............................... 16/235 |
| 2010/0172081 A1* | 7/2010 | Tian et al. ................ 361/679.29 |
| 2010/0195279 A1 | 8/2010 | Michael |
| 2011/0199727 A1* | 8/2011 | Probst ..................... 361/679.09 |
| 2011/0222238 A1* | 9/2011 | Staats et al. ............. 361/679.55 |
| 2011/0267757 A1 | 11/2011 | Probst |
| 2012/0106059 A1 | 5/2012 | Probst et al. |
| 2012/0106060 A1 | 5/2012 | Probst |
| 2012/0106061 A1 | 5/2012 | Probst |
| 2012/0106062 A1 | 5/2012 | Probst |
| 2012/0106078 A1* | 5/2012 | Probst et al. ............. 361/679.56 |

OTHER PUBLICATIONS

International Search Report dated Dec. 20, 2011 (PCT Application No. PCT/US2011/034405).

* cited by examiner

ELECTRONIC DEVICE CASE AND METHOD OF USE

CLAIM OF PRIORITY

The present application claims the benefit of the filing date of U.S. Provisional Application Ser. No. 61/331,870 (filed May 6, 2010), the entirety of the contents of that application being hereby expressly incorporated by reference.

FIELD OF THE INVENTION

The present invention relates to protective cases for hand-held electronic devices. More specifically, the present invention relates to cases that both protect an electronic device and modify the functionality of an electronic device.

BACKGROUND OF THE INVENTION

With a growing number of hand-held electronic devices available to consumers, there is an increasing need for secondary accessories that modify and enhance these devices. Many such accessories exploit existing capabilities of the hand-held devices by enhancing and simplifying a consumer's ability to use the device. As an example, an accessory may be provided to impart additional protection to a hand-held device, so that the risk of damage to certain fragile components of the device is reduced. As yet another example, an accessory may modify a hand-held device so that a modular attachment provides additional functionalities to the device.

One of the more recently developed electronic devices are e-readers or tablet devices having relatively large screens. These tablet devices are often used for reading books, internet browsing, watching stored movies, and other work or recreational activities. Many of these devices, as well as some popular cell phones, and in particular smart phones, have evolved to having a full touch screen and no traditional alphanumeric keyboard. The size and fragility inherent to these touch screens make them highly susceptible to damage. Touch screens also present additional challenges to extensive word processing use in that the lack of a traditional keyboard generally decreases typing fluidity and speed. Further, most hand-held devices are not equipped for long-term use in that a user must continuously hold or otherwise prop-up the device. Therefore, even though many hand-held devices have the capability to function like a personal computer, most are not designed for such extensive usage. As a result, a number of secondary accessories have been developed to modify electronic devices for enhanced and simplified use and to act as a protective case to house the electronic devices.

Many existing secondary accessories suffer from functional deficiencies. As an example, the electronic devices themselves are generally planar and as explained above, need to be propped or angled by hand to view the screen. This can be cumbersome and taxing for extended periods of time and challenging when the user requires both hands to effectively complete a particular project. Many secondary accessories merely provide a covering effect the fails to provide any support function for improved use. Further, some secondary accessories are more decorative and only provide a minimal amount of protection and/or added functionality and relatively little effective protection for the delicate touch/visual screen.

U.S. Pat. No. 7,281,698 discloses a multi-position notebook computer case. The case does not include any means to provide keyboard functionality, a power source, or wireless functionality. The case also does not include a hinge portion for controlling the position of the case.

U.S. Pat. No. 6,144,551 discloses a keyboard insert that includes a foldable cover. The device does not include a means for accepting and integrating an existing hand-held device within the confines of the foldable cover.

Notwithstanding the above, there remains a need for a secondary accessory for an electronic hand-held device that provides one or more of a protective function, a modification function and an enhancement function for the electronic hand-held device.

SUMMARY OF THE INVENTION

The present invention addresses one or more of the above needs by providing a case for protecting and/or modifying an electronic device. The case includes a hinge portion that connects an upper portion to a lower portion. The upper portion includes a recessed area for receiving an electronic device. The lower portion includes one or more features for modifying the functionality of the electronic device. The hinge portion allows for a plurality of varying arrangements and positions for viewing and utilizing the electronic device.

The lower portion may include a front edge, a rear edge, and two substantially parallel side edges. The lower portion may also include an inner surface located between the edges. The inner surface may include a planar portion and a depression portion adjacent the planar portion for receiving an insert, which may be a keyboard insert. Upon placement of an insert within the depression portion the insert may be positioned flush with the planar portion. The planar portion of the lower portion may be located adjacent one or more edges of the depression portion. At least one edge of the depression portion may located adjacent at least one of the side edges of the lower portion. The upper portion is connected to the lower portion via a hinge portion. The upper portion may include a frame portion having one or more edges and a recessed area for receiving an electronic device located within the confines of the frame portion. The upper portion may further include a pocket for receiving an edge of the electronic device, the pocket being located substantially parallel to at least one edge of the one or more edges of the frame portion. The hinge may include one or more pin structures, each including a means for attaching the hinge to the lower portion and upper portion of the case.

In another aspect, the present invention contemplates a method for modifying and/or protecting an electronic device. The method includes providing a lower portion, upper portion, and hinge portion. The hinge portion may then be attached to the lower portion and upper portion. A keyboard insert may then be located within the lower portion and an electronic device may be located within the upper portion. The lower portion may include at least one edge and an inner surface located within the at least one edge, the inner surface having a planar portion and a depression portion. The upper portion may include a recessed area for receiving the electronic device. The recessed area may include a pocket for receiving an edge of the electronic device, the pocket being located substantially parallel to at least one edge of the upper portion. The lower portion may further include one more or apertures located along a portion of the at least one edge. The upper portion may include at least one edge and one more or apertures located along a portion of the at least one edge. The hinge portion may include one or more pin structures each having a rounded end and a substantially planar end. The planar end of each pin structure may include one or more apertures so that each aperture corresponds to an aperture along an edge of the lower portion or an edge of the upper portion. The hinge portion may be attached to the upper and lower portion by locating an attachment means within each aperture of the one or more pin structures and each corresponding aperture along an edge of the lower portion or an edge of the upper portion. The keyboard insert may be located within the depression portion of the lower portion so that at least a portion of the keyboard insert is flush with the planar portion. The electronic device may be located within the recessed area of the upper portion so that an edge of the electronic device contacts the pocket for receiving an edge of the electronic device.

The case of the present invention provides a means for protecting an electronic device while also improving the ease with which the device can be utilized. The case further allows for an electronic device to be integrated into a system which includes additional functionalities that may not be present in the electronic device alone. The case results in improved protection and transport of the electronic device while also providing a user with a standard alpha-numeric keyboard function, power supply for the keyboard device, physical support and additional flexibility in use and function of the electronic device.

DETAILED DESCRIPTION

The case disclosed herein includes a lower portion, an upper portion and a hinge portion, whereby the hinge portion connects the upper portion to the lower portion. The upper portion includes a recessed area for receiving an electronic device and the hinge portion allows for a plurality of varying arrangements and positions for viewing and utilizing the electronic device. The lower portion may include one or more features for modifying the functionality of the electronic device. These features may include a keyboard insert.

Figure 1:
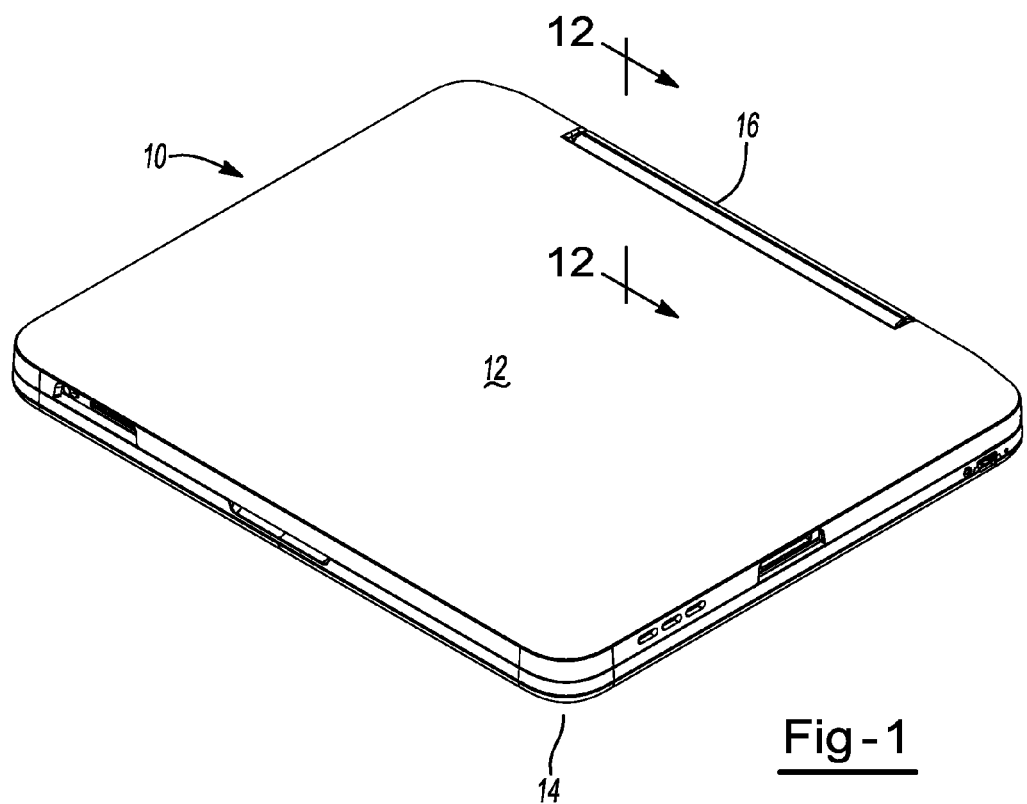
FIG. 1 is a perspective view of an illustrative example of the case in accordance with the present invention shown in the closed position.
Figure 2:
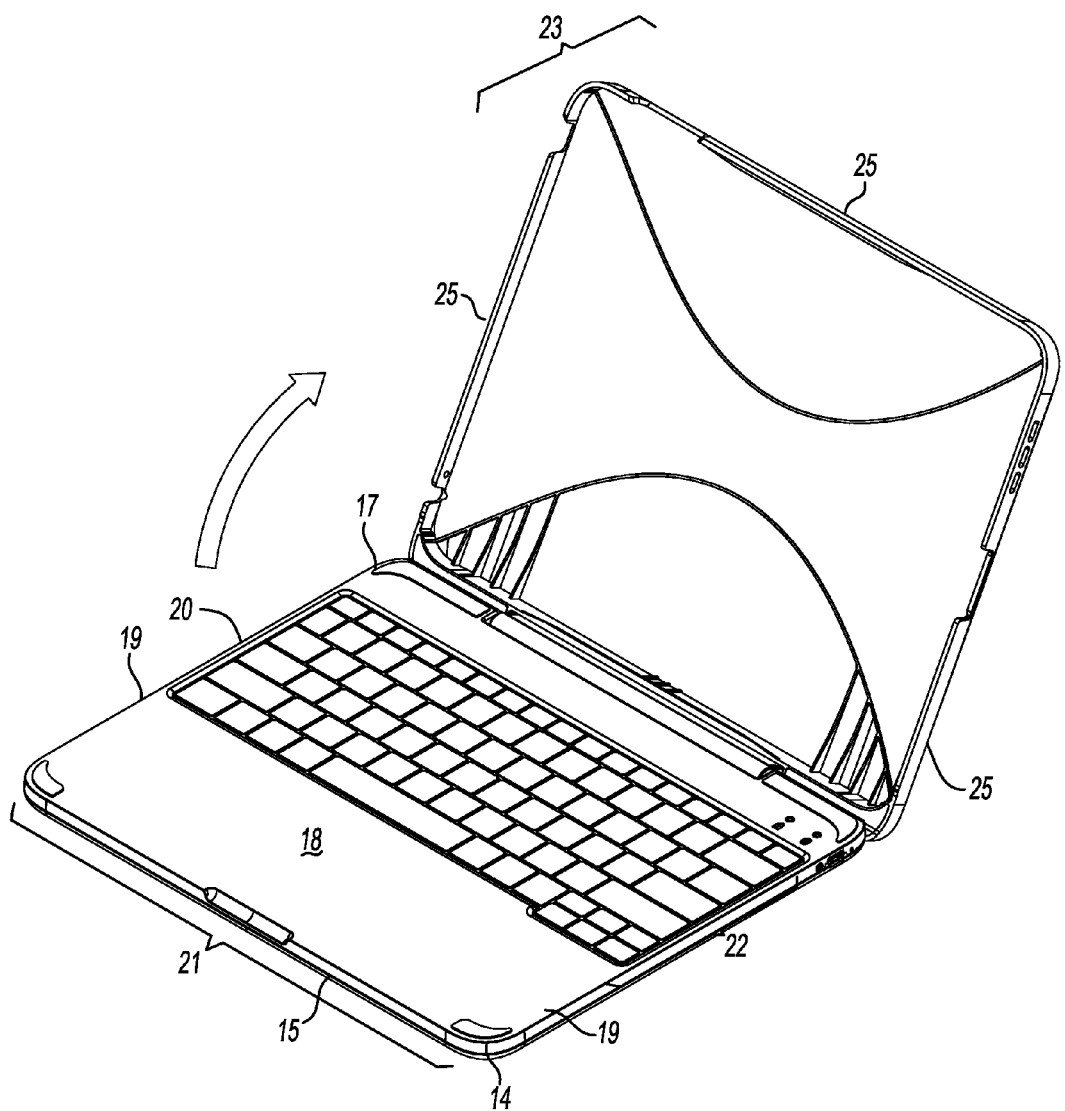
FIG. 2 is a perspective view of the case of FIG. 1 shown in an open position.
Figure 3:
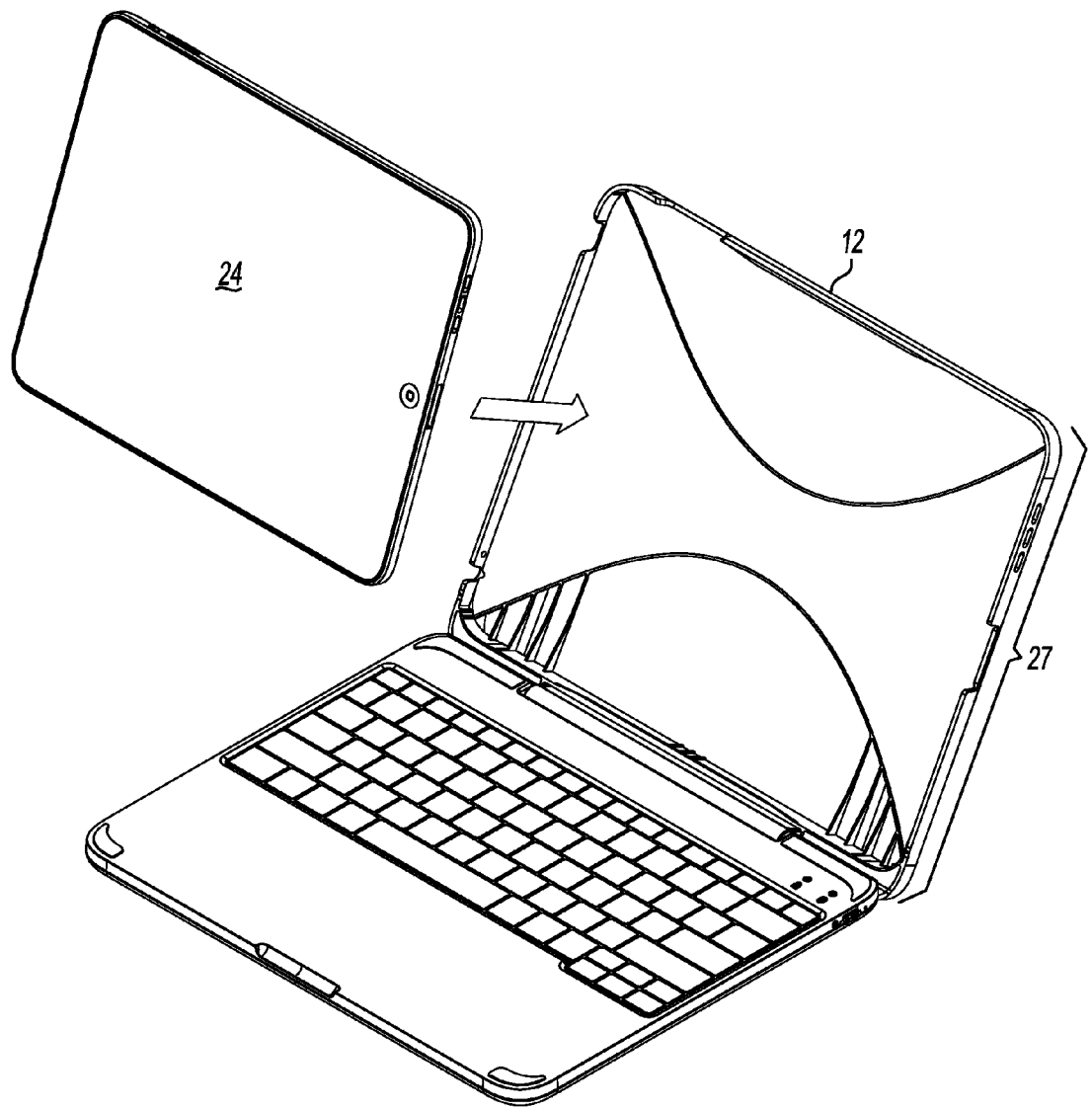
FIG. 3 is a perspective view of the case of FIG. 2 shown prior to an electronic device being located within the case.
Figure 4:
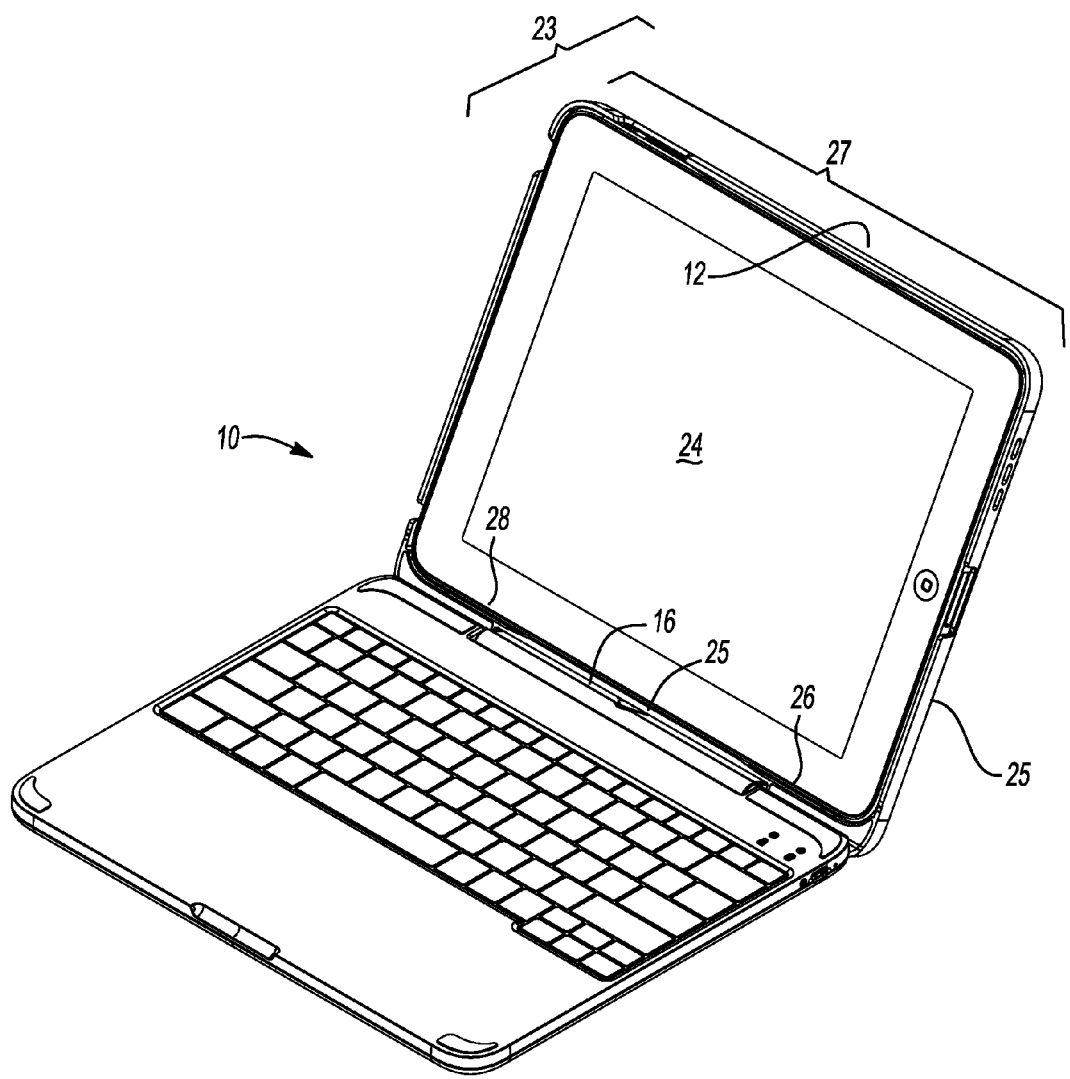
FIG. 4 is a perspective view of the case of FIG. 2 shown with an electronic device located within the case.

As shown for example in FIG. 1, the illustrated case 10 (shown in the closed position) includes an upper portion 12, a lower portion 14, and hinge portion 16. The illustrated case is shown in the open position at FIG. 2 where the lower portion 14 includes a front edge 15, a rear edge 17, and two side edges 19, having an inner surface 21 located within the edges. The lower portion 14 further includes a planar portion 18, a depression portion 20 and a keyboard insert 22. The upper portion 12 includes a frame portion 23 having four edges 25. An electronic tablet device 24 is shown at FIG. 3 prior to locating the electronic device within the recessed area 27 of the upper portion 12. FIG. 4 shows an example of the case 10 including an electronic device 24 (e.g., a primary electronic device) located therein. A pocket 26 is included within the recessed area 27 of the upper portion 12 for receiving an edge 28 of the electronic device 24. The frame portion 23 defines the pocket 26 positioned toward the hinge portion 16 which allows a portion of the electronic device 24 to be angularly inserted and seated into the pocket 26 and the opposing end of the device 24 to be angularly rotated into a flush, or substantially flush position with the other three sides 25 of the frame portion 23 adjacent the pocket 26 as generally shown. In a preferred example, the pocket 26 is relatively small, about an eighth (⅛) of an inch deep from frame edge 25. In the example shown, the recessed area 27 and pocket 26 are preferably sized to accommodate the width or thickness of an exemplary e-reading device or tablet.

Figure 5:
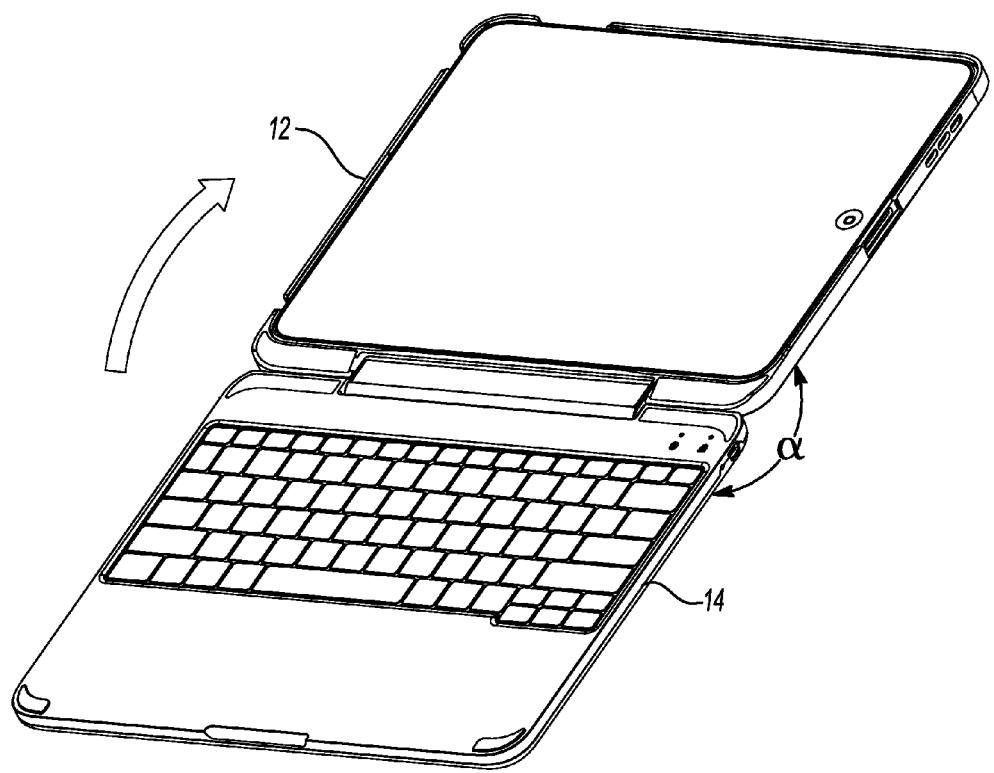
FIG. 5 is a perspective view of the case and electronic device of FIG. 4 as the case is in the process of opening into an extended position.
Figure 6:
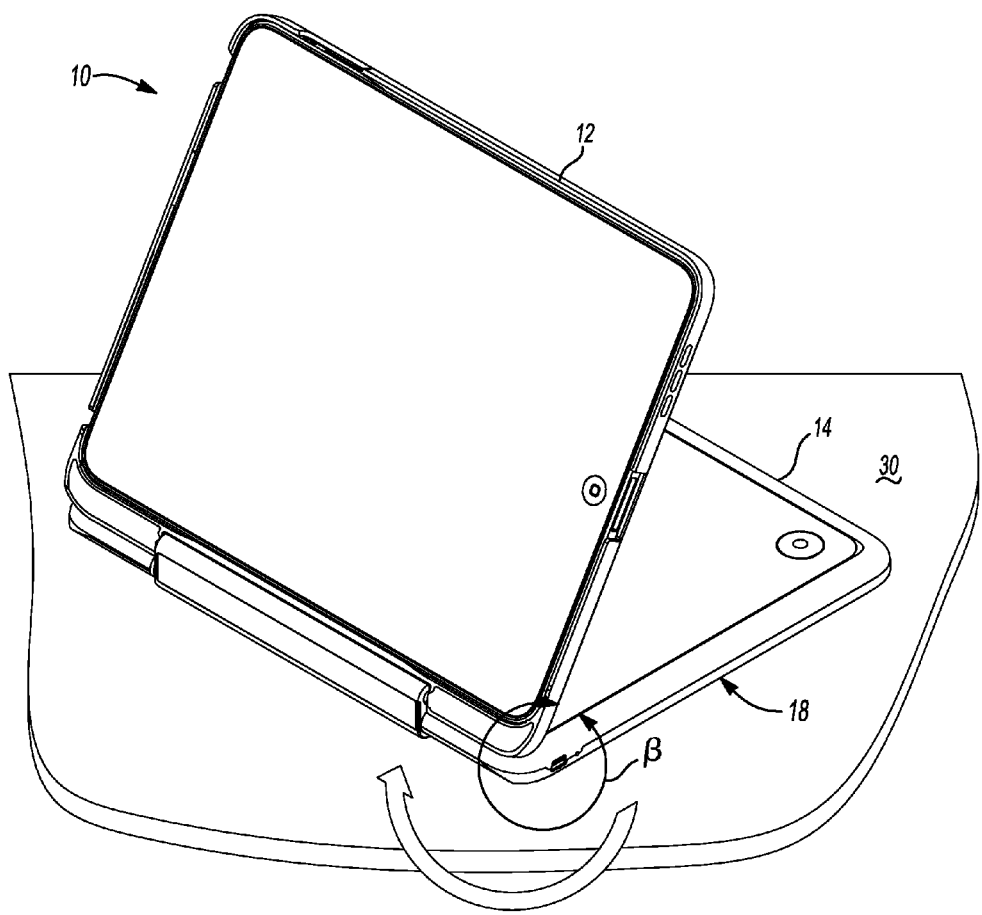
FIG. 6 is a perspective view of the case and electronic device of FIG. 4 with the case located into a partially extended position.
Figure 7:
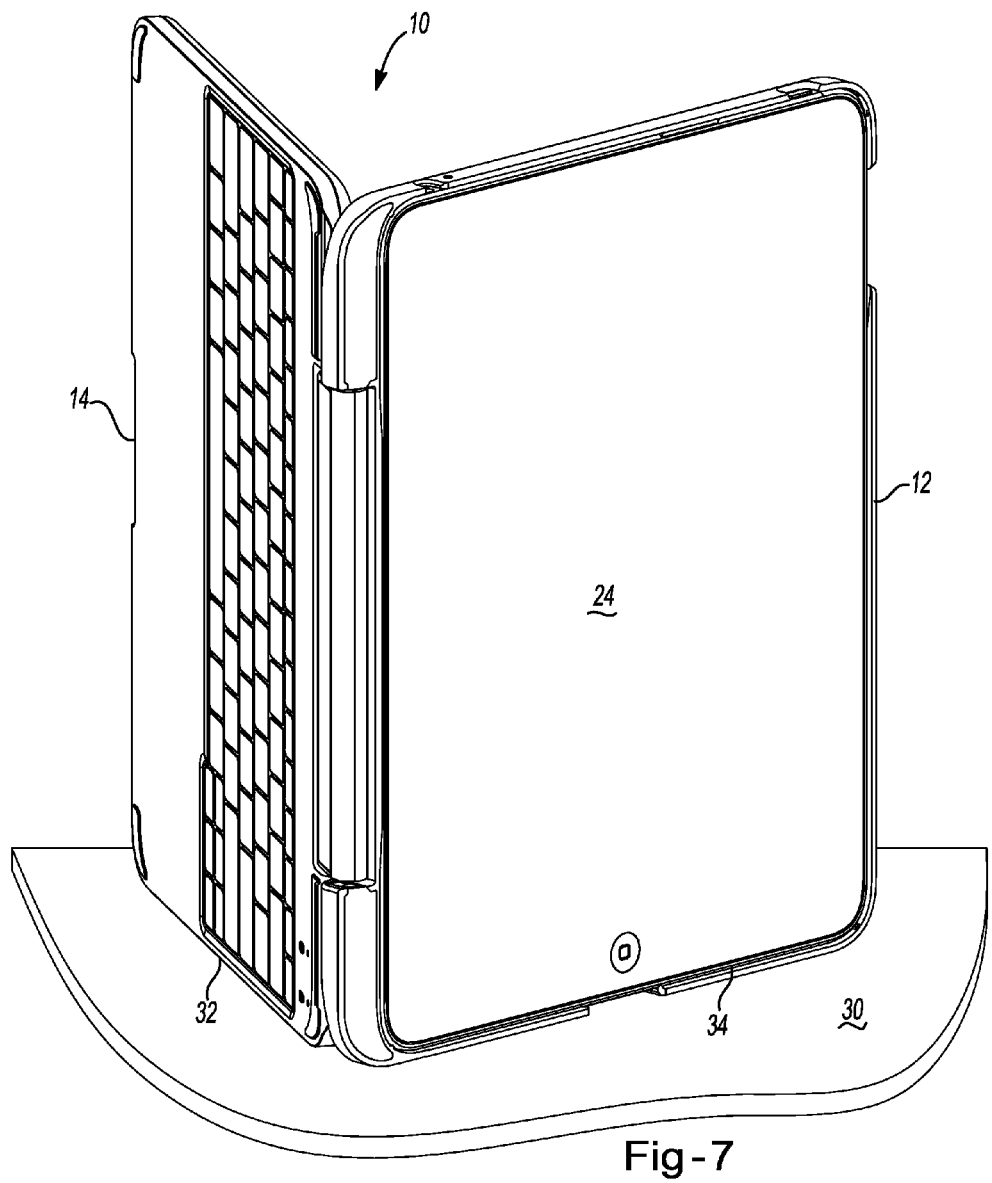
FIG. 7 is a perspective view of the case and electronic device of FIG. 4 with the case located into a side-edge partially extended position.
Figure 8:
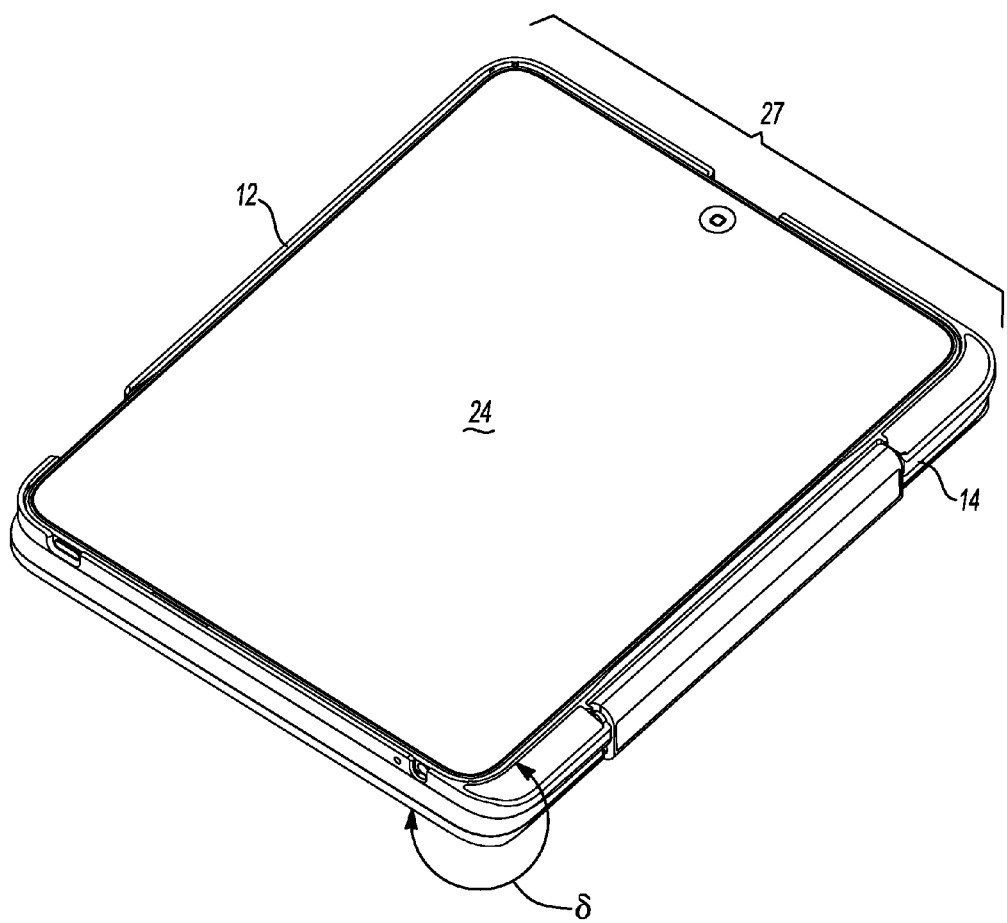
FIG. 8 is a perspective view of the case and electronic device of FIG. 4 with the case located into a fully extended position.

As shown for example in FIGS. 5-8, the case may be opened to one or more partially and/or fully extended positions. FIG. 5 shows the upper portion 12 located at an angle (α) of about 180° in relation to the lower portion 14. FIG. 6 shows the case 10 in a partially extended position whereby the upper portion 12 is located at an angle (β) of greater than 180° in relation to the lower portion 14. The planar portion 18 of the lower portion 14 is shown resting on a substrate 30. An alternative arrangement for the case 10 in partially extended form is shown at FIG. 7, where a side edge 32 of the lower portion 14 and a side edge 34 of the upper portion 12 are shown as resting on the substrate 30 so that the electronic device 24 may be viewed in a vertical position. FIG. 8 depicts an example of the case 10 in a fully extended position whereby the upper portion 12 is located at an angle (δ) of about 325° in relation to the lower portion 14. In the fully extended position, the upper portion 12, lower portion 14, and electronic device 24 (or alternatively, the recessed area 27 if no device is located into the case) are arranged in substantially parallel relation to one another such that the upper portion 12 is located between the lower portion 14 and the electronic device 24.

Figure 9A:
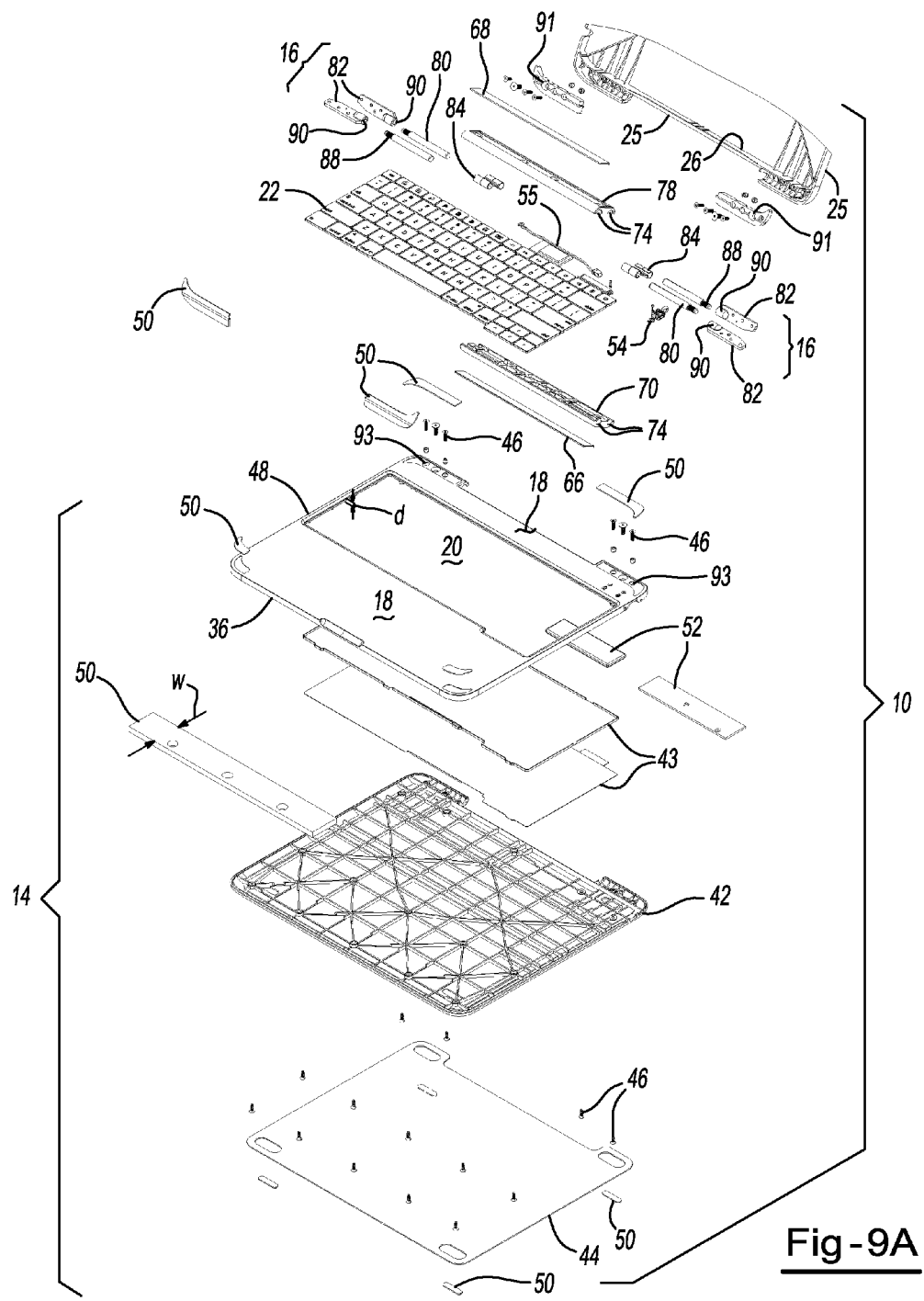
FIGS. 9A and 9B are deconstructed views of two illustrative examples of the case of the present invention.
Figure 9B:
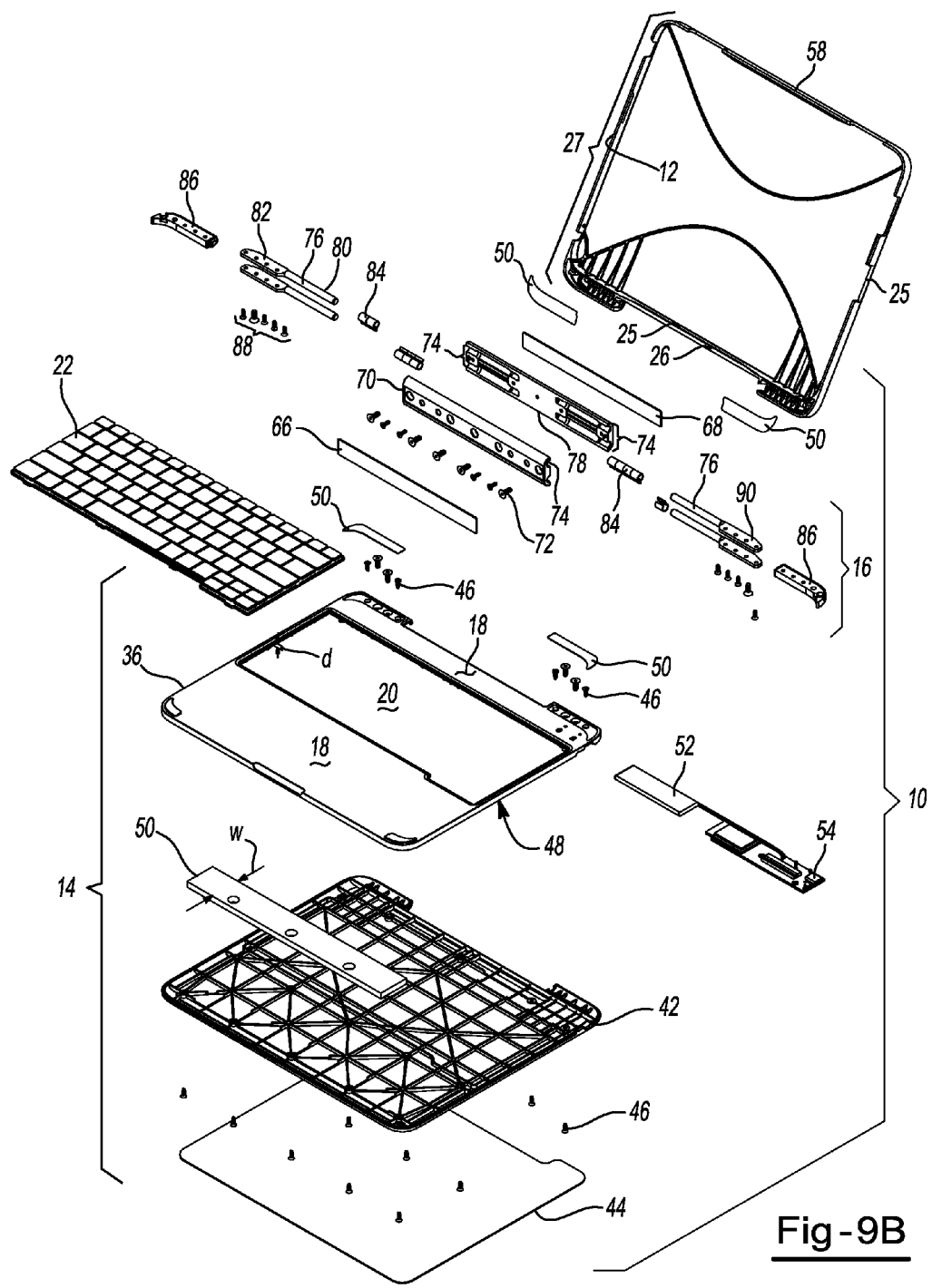

Deconstructed views of two embodiments of the example case 10 are shown at FIGS. 9A and 9B. The lower portion 14 includes a base 36 having a planar portion 18 and a depression portion 20. The depression portion 20 may be shaped so that upon insertion of a keyboard insert 22 into the depression portion 20, the keyboard insert 22 may be flush with the planar portion 18. The base 36 is located onto a frame 42 which is in turn located onto a substantially planar lower shell 44. One or more intermediate plates 43 may be located in planar contact with one another between the base 36 and frame 42, as shown in FIG. 9A. The frame 42 may be attached to the base 36 and/or the one or more intermediate plates 43 by one or more mechanical fasteners 46 (e.g., screws). The mechanical fasteners 46 may be covered by one or more caps 50 so that the screws are not visible. The caps 50 may be a rubberized/elastomeric material so that when the caps contact a substrate during use of the case, the rubberized surface will prevent unwanted movement. Thus, any surface of the case that may contact a substrate during case use may include one or more caps.

By virtue of the location of the depression portion 20, the bottom surface 48 of the base 36 may be uneven whereby upon placement of the base 36 onto the frame 42, only the depression portion 20 may contact the frame 42. The lower portion may thus further include a front platform 50 located between the planar portion 18 of the base 36 and the frame 42 wherein the width (w) of the platform 50 is substantially equivalent to the depth (d) of the depression portion 20. Similarly, the lower portion 14 may include a rear platform 52. The rear platform 52 is located between the planar portion 18, (preferably the planar portion 18 located above the depression portion 20) and the frame 42. The rear platform 52 may also have a width substantially equal to the width (w) of the front platform 50. The rear platform 52 may be a one-piece structure as shown in FIG. 9B or a multi-piece structure as shown in FIG. 9A (shown at 54 and 55). The rear platform may also include one or more port structures 54. The port structures 54 may be located in direct contact with the rear platform 52 as shown in FIG. 9B, or may be located adjacent the rear platform 52

The upper portion 12 includes an upper shell 58 (fully shown at FIG. 9B) having one or more edges 25. The upper shell 58 includes a recessed area 27 for receiving an electronic device (not shown). The recessed area 27 may include a pocket 26 for receiving an edge of the electronic device. The upper portion may also include one or more caps 50 for obscuring exposed portions of the upper portion. The upper portion 12 may be connected to the lower portion 14 by a hinge portion 16. As shown for example at FIG. 9A, the upper portion may include one or more apertures 91 located adjacent the hinge portion 16 for attaching the top portion to the hinge portion by locating one or more fasteners within the apertures. The bottom portion may be similarly attached to the hinge portion by locating one or more mechanical fasteners within one or more apertures 93 located along an edge of the bottom portion.

The hinge portion 16 includes a front face 66 and a rear face 68. A first inner plate 70 is located adjacent the front face 66. As shown in FIG. 9B, the first inner plate may be configured to receive an attachment means 72. The first inner plate may also be attached by an adhesive or friction fit. The first inner plate 70 may also include one or more indentations 74 for receiving one or more pin structures 76. A second inner plate 78 may be located adjacent the rear face 68 and opposing and attached to the first inner plate 70 by the attachment means 72. The second inner plate 78 also includes one or more indentations 74 for receiving the one or more pin structures 76. The pin structures 76 may each include a rounded end 80 and a substantially planar end 82. As shown for example in FIG. 9A, the planar end 82 and rounded end 80 of each pin structure may be formed as separate pieces that require connection during hinge assembly. As such, each rounded end 80 may include a narrowed section 81 that may be connected to the planar portion 81 by an adhesive or friction fit. The narrowed portion 81 may be located into a rounded cavity 90 formed at the end of the planar portion formed for receiving the narrowed portion 81 of each rounded end 80.

The pin structures 76 may include one or more clip structures 84 for maintaining the location of the pin structures 76 within the indentations 74. An insert 86 may be located between the planar ends 82 of two adjacent pin structures 76, as shown in FIG. 9B. The planar ends 82 and the insert 86 may include apertures 90 so that one pin structure can be connected to another pin structure by locating a connecting means 88 through the apertures.

Figures 10, 11:
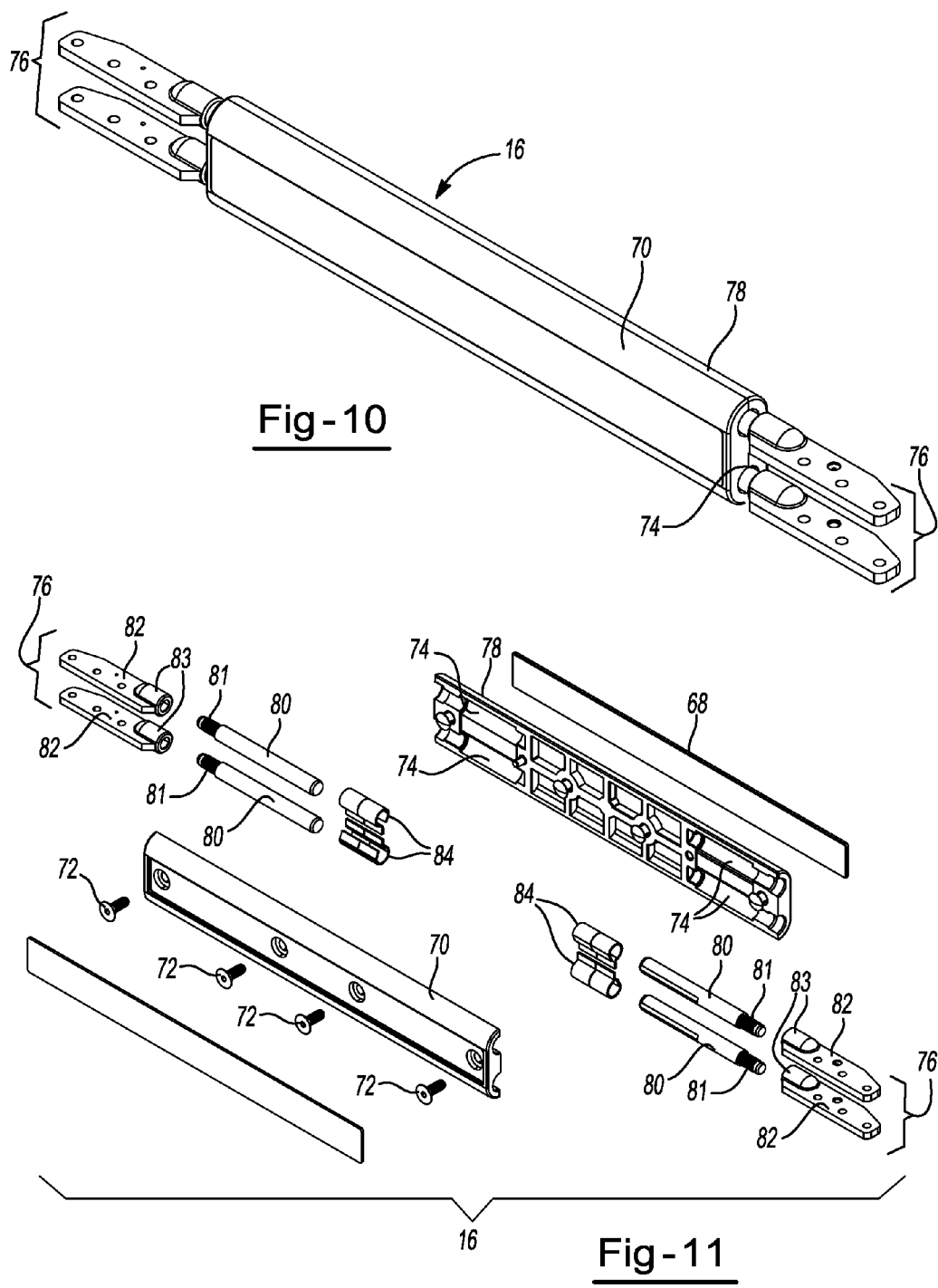
FIG. 10 is a perspective view of the hinge portion of an illustrative example of the case of the present invention.
FIG. 11 is a deconstructed view of the hinge portion of FIG. 10.

FIG. 10 depicts an example assembled hinge portion 16, the pin structures 76 being located within the indentations 74 of the first inner plate 70 and second inner plate 78. The same hinge portion 16 is shown prior to assembly at FIG. 11. In order of assembly, the clip structures 84 may be located onto the rounded end 80 of each pin structure 76. The rounded ends 80 of the pin structures 76 may then be connected to the substantially planar ends 82 of the pin structures by placing the narrowed section 81 of each rounded end 80 within an opening 83 of each planar end 82. The rounded ends 80 may then be located within the indentations 74 of the second inner plate 78 so that the planar ends 82 of each pin structure remain beyond the edge of the second inner plate. The first inner plate 70 may then be connected to the second inner plate 78 via one or more attachment means 72. The front face 66 and rear face 68 may then be located onto the first inner plate 70 and second inner plate 78, respectively.

Figure 12:
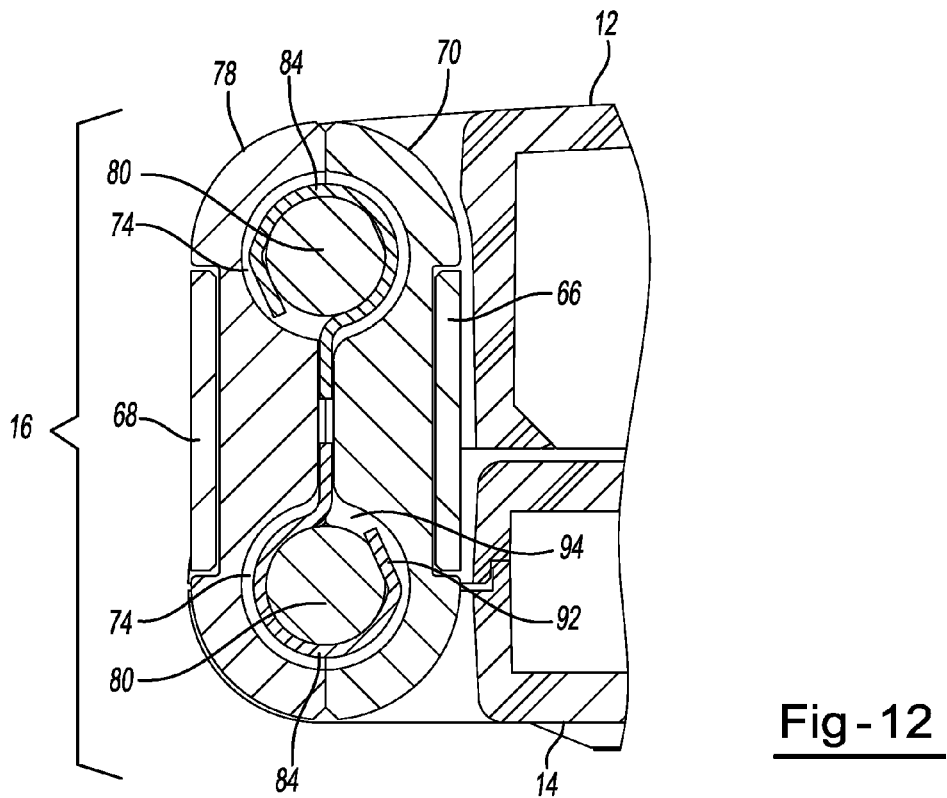
FIG. 12 is a profile view of an illustrative case showing the hinge portion and case in a closed position.

Referring to FIGS. 12 and 12A-12C, a cross-section (as viewed along a horizontal axis) of the hinge portion 16 is shown at closed, partially extended, and fully extended case positions. More specifically, FIG. 12 shows the hinge portion 16 when the case is in a closed position, such that the upper portion 12 is located substantially parallel to the lower portion 14. The front face 66 and rear face 68 are shown attached to the first inner plate 70 and second inner plate 78, respectively. The clip structures 84 are shown located about the rounded end 80 of each pin structure. A first end 92 of the clip structure 84 extends upward in generally the same direction as the upper portion 12 and into the cavity 94 created by the indentations 74.

Figure 12A:
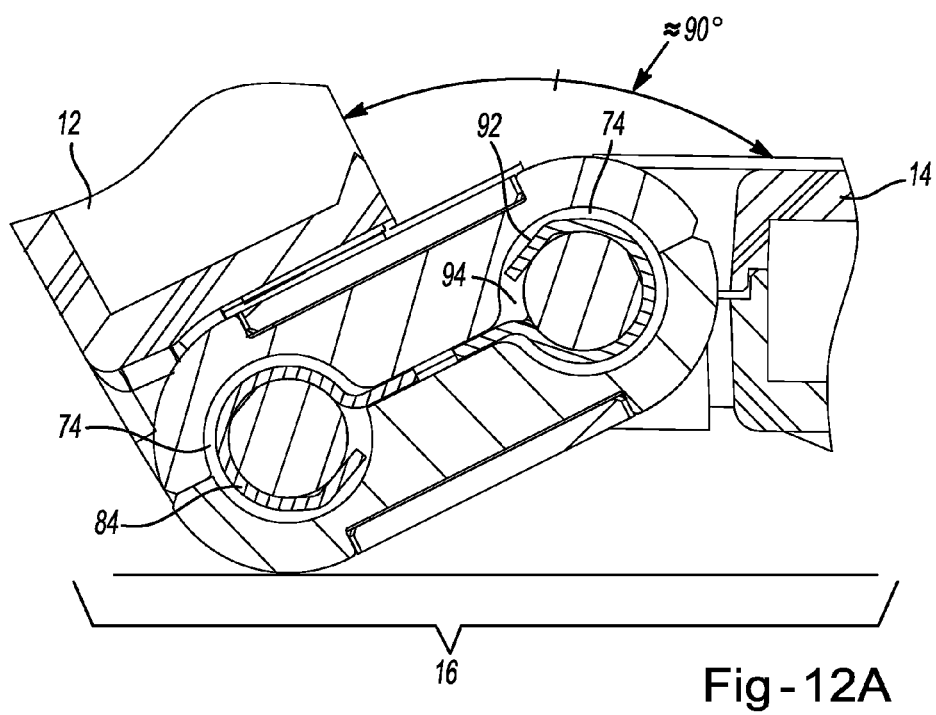
FIG. 12A is a profile view of an illustrative case showing the hinge portion and case in an open position.
Figure 12B:
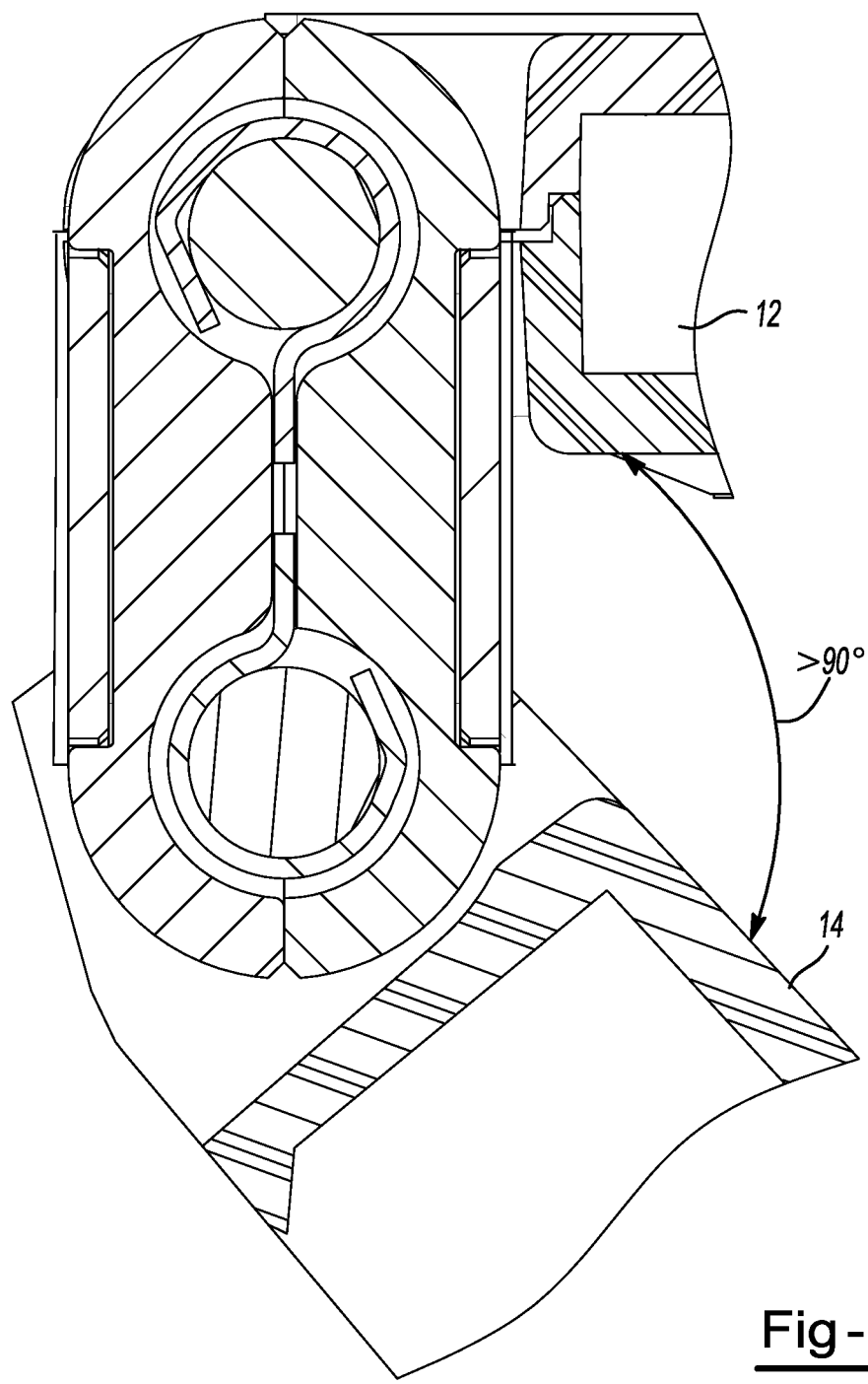
FIG. 12B is a profile view of an illustrative case showing the hinge portion and case in a partially extended position.
Figure 12C:
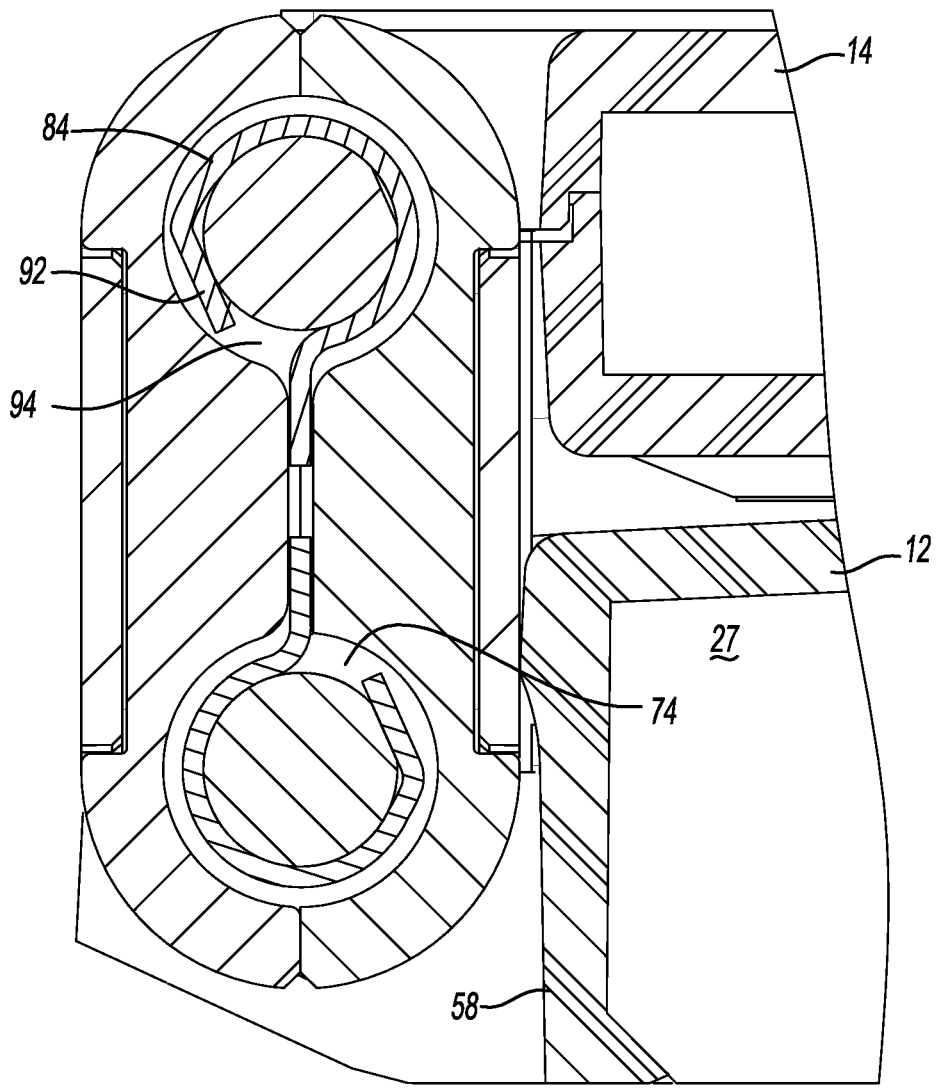
FIG. 12C is a profile view of an illustrative case showing the hinge portion and case in a fully extended position.

FIG. 12A shows the hinge portion 16 in an exemplary partially extended position similar to how a conventional laptop may be viewed so that the upper portion 12 and lower portion 14 are located at angle relative to each other that is from about 90° to about 120°. The first end 92 of the clip structure 84 is now extending in a direction generally perpendicular to the upward direction of the upper portion 12. As shown for example in FIG. 12B, the case may be located in a number of varying partially extended positions, including those where the upper portion 12 and lower portion 14 are located at an angle that is substantially greater than 90° relative to one another. As previously shown at FIG. 8, the case may also be located in a fully extended position so that the upper portion 12 and lower portion 14 are again substantially parallel to one another, resulting in the hinge portion orientation shown at FIG. 12C. Unlike the parallel orientation of the upper portion and lower portion shown at FIG. 1 (the closed position), the fully extended position places the upper portion 12 so that the recessed area 27 of the upper shell portion 58 is exposed. The extended end 92 of the clip structure 84 is again extended into the cavity 94 created by the indentations 74.

Figure 13:
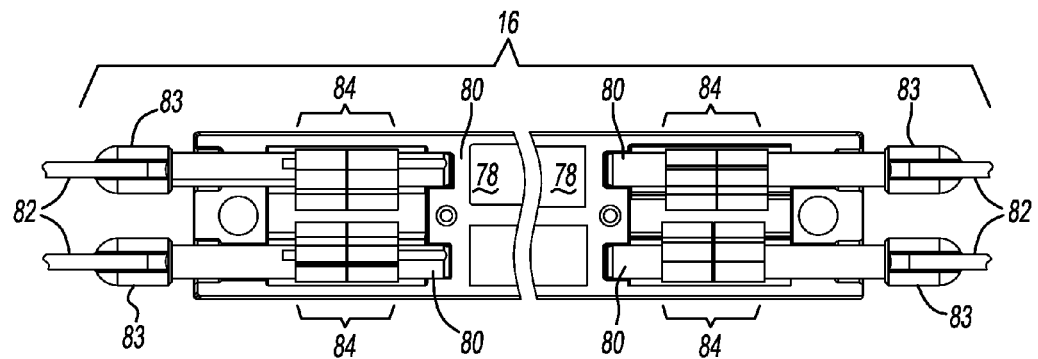
FIG. 13 is a cross-sectional view of the hinge portion of an illustrative case in accordance with the present invention.

A cross-sectional view (along a vertical axis) of the hinge portion 16 is shown at FIG. 13, wherein the rounded ends 80 of the pin structures are shown located within the indentations 74 of the second inner plate 78. The clip structures 84 are located onto the rounded ends 80 of the pin structures. The clip structures 84 are shown having identical lengths but may also be of varying lengths as shown at FIG. 9B.

Figure 14:
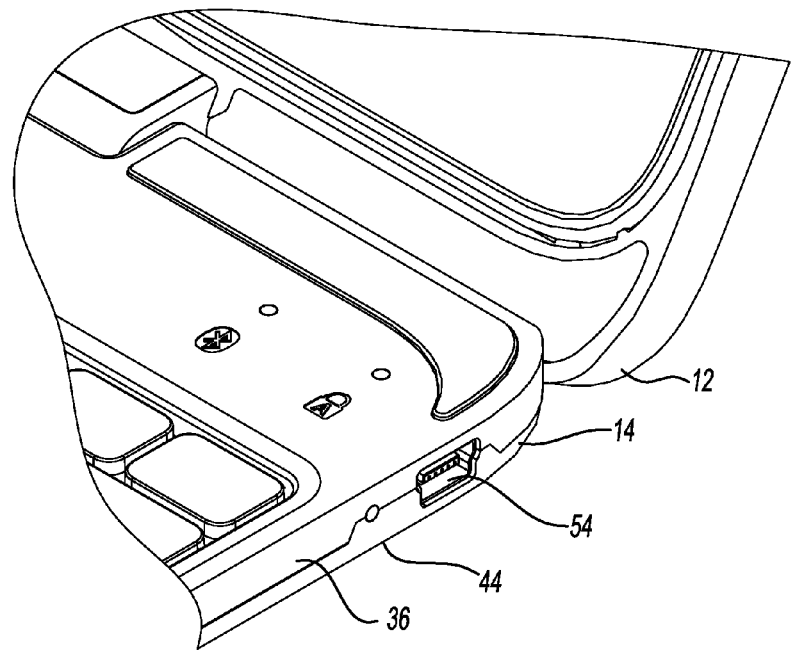
FIG. 14 is a perspective view of an illustrative example of the connection of the case and hinge.

FIG. 14 shows the corner of an assembled case in a partially extended position. The upper portion 12, lower portion 14 and edge of the hinge portion 16 are shown as viewed from the exterior of the case. The port structure 54 is shown located in the cavity formed by assembly of the base 36 and bottom shell 44 of the lower portion.

During use, the case is opened by a step of rotating the upper portion relative to the lower portion about the hinge portion thereby exposing the recessed area of the upper portion. The electronic device, for example an e-reader/tablet device, is positioned within the recessed area. Depending upon the application, the user then manipulates the upper portion and lower portion for ease of use, for example rotating the upper portion about 330° away from the lower portion and standing the case on a firm, substantially horizontal surface so that the visual screen of the electronic device is readily viewable by the user. If the case is equipped with a keyboard insert, a Bluetooth controller may establish communication between the keyboard insert and the electronic device so that the user can input data through the keyboard insert and to the electronic device. If the user wishes to use the electronic device in a tablet configuration, the upper portion may be rotated to a fully open position whereby the upper portion is positioned substantially 325° away from the lower portion so that only the upper portion and electronic device are visible to the user as the lower portion is positioned substantially behind the upper portion. In the event that the user desires to utilize the full protection of the electronic device by the case, the upper portion is rotated to a closed position substantially encompassing the entire electronic device by the upper portion and lower portion.

As presented herein, the case includes an upper shell portion and lower shell portion, the shell portions being the outermost components of the case. The shell portions may be substantially planar or may have a contoured shape. The shell portions not only protect the interior components of the case, but also provide a durable and aesthetically pleasing exterior to the case. The shell portions may each be a unitary component or may be a multi-piece component that requires assembly. The lower shell portion is attached to the frame of the lower portion. The lower shell may be attached via an adhesive, a mechanical fastener, or may be engaged with the frame by a friction fit. The lower shell portion and lower frame may be arranged in planar contact with one another and may further be of substantially the same size and shape. The length of the lower shell portion and frame may thus be substantially similar to the length of the electronic device and/or keyboard insert placed within the case. Alternatively, the length of the lower shell portion and frame may be greater than the length of the electronic device and/or keyboard located within the case. Preferably, the length, width, and shape of the lower shell portion and frame are substantially similar to that of the base of the lower portion. The base of the lower portion may thus be located in contact with the frame, so that the base, frame and lower shell portion all lie substantially parallel to one another. The frame may be attached to the base via a plurality of mechanical fasteners (e.g., screws) as shown in FIGS. 9A and 9B. Alternatively, the frame may be attached to the base via an adhesive or friction fit. As an example, the base and outer shell may be attached to one another along the perimeter of each so that the frame is contained within the attached base and outer shell.

The frame of the lower portion provides a support structure to the base and keyboard insert. The frame may include a lattice structure or may be a formed of a continuous sheet of material. The frame may include one or more openings for receiving an attachment means. As an example, the frame may include a plurality of apertures for receiving a plurality of mechanical fasteners. As shown at FIG. 9A, the frame may also be located in adjacent one or more intermediate plates. The one or more intermediate plates may be located so that they cover the entire top surface of the frame or may be arranged so as to cover only a portion of the frame. The one or more intermediate plates may be located beneath the depression portion to provide support and/or connectivity for any user interface device (e.g., keyboard, mouse, touchpad, storage device etc.) located within the depression portion.

The frame may also contact one or more platform structures. The platform structures may be located between the base and the frame. More specifically, the platform structures may be located beneath the planar portions of the base and adjacent the depression portion of the base so as to offset pressure on the depression portion of the base. The platform portions may extend beneath only a portion of the planar portion of the base, or may extend beneath the entire planar portion of the base. The platforms may also include one or more openings for receiving an attachment means. As an example, an attachment means may extend through the frame and through a platform portion. The location of the platform structures adjacent the depression portion of the base may create a cavity between the frame and the base that can be filled by the thickness of the platform structures. Alternatively, one or more platform structures may contain one or more ports or additional structures that fill the cavity and facilitate a function of the case when an electronic device is located within the case. For example, a platform structure may include a port for receiving a power supply, or a port for connecting the case (and thus the electronic device) to a secondary device, such as a modem, cellular phone, or storage device. As another example, while installed in the case, the electronic device could be connected to a power source (which may or may not be integrated into the case itself) to charge an internal battery of the electronic device. The electronic device could be connected to a USB cord or other communication cables for transfer of data or signals between a secondary device for enhanced viewing or processing by the primary electronic device.

The lower portion may further include a counterweight located adjacent the lower shell, the frame, or the platform structures. Such a counterweight may be useful in offsetting the weight of the electronic device mounted in the upper portion for a balanced and stable platform for the electronic device. The platform structures themselves may also be the source of the counterweight.

The depression portion of the base may be formed for accepting a keyboard insert. The depression portion may also accept a navigation tool, such as a mouse or touchpad. The depression portion may also accept an additional (e.g., secondary) electronic device for user interface that can be connected to the primary electronic device located within the upper portion for controlling the function of the primary electronic device. The shape of the depression portion may be designed so that a specific keyboard insert may engage the depression portion in an interference fit. The size and shape of the depression portion may also be modifiable so that any insert placed within the depression portion may engage the depression portion. Alternatively, the depression portion may receive one or more interchangeable inserts for modifying the shape and size of the depression portion. As an example, the shape and size of the depression portion may engage a specific keyboard insert in an interference fit, but upon removal of the keyboard insert may receive an insert that reduces the overall size of the depression portion to engage a much smaller touchpad.

The upper portion includes the upper shell portion having one or more edges that form an upper frame. Alternatively, the upper shell portion may contact a separate upper frame structure located within the edges of the upper shell portion. The upper frame may surround the recessed area. The recessed area may be a cavity formed between the upper shell portion and the upper frame so that an electronic device can be located within the recessed area created by the upper shell portion and upper frame. The upper shell portion may include one or more raised surfaces and/or edges extending from the upper shell portion into the recessed area. These raised surfaces may assist in locating and supporting an electronic device placed within the recessed area. The edges that form the upper frame may lie substantially perpendicular to the upper shell portion. One or more of the edges that form the upper frame may include a lip arranged adjacent the edge and substantially perpendicular to the edge to assist in maintaining the location of an electronic device located within the upper frame. Upon insertion of an electronic device into the upper frame, a portion of the front surface of the electronic device will contact the lip thereby preventing the device from becoming disengaged from the upper frame. The upper shell portion, an edge and an adjacent lip may together form a pocket for receiving the electronic device. As shown in FIG. 4, the pocket may be located adjacent the hinge portion. One or more edges may further include a cut-out portion whereby a user can contact an electronic device located within the upper frame to remove the electronic device from the frame.

Optionally, one or more clip structures can be used to assist in securing an electronic device into the recessed area. The clip may be connected to the upper frame and selectively rotated into position to prevent dislodgment of the electronic device from the recessed area.

The upper portion and lower portion may be connected by a hinge portion. The hinge portion is formed to allow nearly 360° movement of the upper portion and lower portion about the hinge portion. The hinge is thus formed having multiple pins to allow for independent movement of the upper portion and lower portion about the hinge. As an example, the hinge portion may include four pin structures such that two pin structures are attached to the upper portion and two pin structures are connected to the lower portion. The two pin structures attached to the upper portion may include a right upper pin and a left upper pin. The two pins attached to the lower portion may include a right lower pin and a left lower pin. The hinge portion may at least partially enclose the pins. The hinge portion may include inner plates for locating and maintaining the pins between the inner plates. The inner plates may include cavities (e.g., indentations) for receiving the pins.

Prior to placement of the pins within the cavities formed by the inner plates, one or more clips may be located onto the pins. The shape, size, and location of the clips assist in permitting the case to be opened to and maintained in a plurality of varying positions. The clip and pin assembly allows for adjustable torque-style functionality which provides controlled resistance of the hinge about its axis so the user-selected position of the upper and lower portions securely remain in the selected position until manually changed by the user. The clips and pins may be rounded in shape to allow the pins to spin within the hinge. While a portion of each pin is located in the cavity formed between the inner plates, a portion of each pin may be located outside of the cavity. The portion of each pin located outside the cavity may facilitate attachment of the pins to the upper portion and lower portion. More specifically, each pin may include one or more openings for receiving a mechanical fastener, such as a screw or the like. In order to attach the pins to the upper portion and lower portion, the upper and lower portion may include a plurality of openings that correspond to the openings in the pins. The openings of the upper and lower portions may be located adjacent an edge of both the upper portion and lower portion and preferably the edge located adjacent the hinge. Thus, any mechanical fastener used may be located through an opening in a pin and a corresponding opening located in either the upper or lower portion. The portion of each pin that is attached to the upper and lower portion may be substantially planar in shape.

Based upon the location of each pin within the cavity formed by the inner plates, a space may be formed between the upper and lower left pins and the upper and lower right pins. Thus, an insert may be located in the space between the pins, such that the insert also includes openings for receiving the mechanical fastener. A front face and rear face may be located adjacent each inner plate so that any mechanical fasteners are obscured. The front face and rear face may be located onto the hinge with an adhesive or may be engaged by a friction fit with the inner plates. Although shown as a single, continuous hinge, other styles and configurations of hinges, for example two smaller hinges axially spaced along an axis may be used.

The upper portion, lower portion, and hinge portion as described herein provides for advantageous positioning and orientation by a user unlike prior devices. For example, the case can be opened about 320° and stood on one side edge of each of the upper portion and lower portion. The case may be stood on the planar surfaces of the lower portion to hold and suspend the electronic device in a convenient orientation for the user to, for example, watch a movie on an airliner tray table. The torque-style hinge will hold the upper portion in a desired position relative to the lower portion as manipulated by the user for maximum flexibility and convenience for the user. If the task or purpose of the electronic device changes, for example from reading a book to sending an email, the upper portion and lower portion are manipulated to expose the keyboard insert relative to the upper portion similar to a laptop computer. While complimenting the functionality and usability of the electronic device, the case provides a protective shell and cover for the electronic device from outside forces, for example spills, harsh surfaces and other hazards.

As mentioned above, the lower portion may also house additional components, for example, a power supply, a Bluetooth control device, and other accessory devices and/or controllers. As an example, the keyboard insert communicates with the electronic device through the Bluetooth protocol to send signals to the electronic device which are read and executed by the onboard operating system and controllers in the electronic device. This eliminates the need for wiring harnesses and electronic connections between the electronic device, keyboard insert, or any other secondary electronic device that may be connected with the case. The power supply may provide power to run the Bluetooth control device, power to run the keyboard insert, and/or power to run any other case accessories. A power source may be located within the case to provide power to the electronic device itself. A power switch to enable and disable the Bluetooth system may also be integrated into the upper or lower portion. Alternatively, a physical and electronic connection can be made between the electronic device and the case depending upon the primary and/or secondary electronic devices being used or the application of such devices. Such secondary electronic devices are preferably positioned within the lower portion and may be independent or connected through other controllers or processors in order to maximize the efficiency and functionality of the case with the selected primary and/or secondary electronic devices.

Materials providing the requisite rigidity to protect an electronic device located within the case may include polymeric materials including but not limited to thermoplastics, thermoset plastics, elastomeric containing materials or any combination thereof. Examples of polymeric and elastomeric materials that may be employed include nylon, polyvinyl chloride, polypropylene, high-density polyethylene, low-density polyethylene, linear low-density polyethylene, polyvinylidene chloride polyamide, polyester, polystyrene, polyethylene, polyethylene terephthalate, bio-based plastics/biopolymers (e.g., poly lactic acid), silicone, acrylonitrile butadiene styrene (ABS), rubber, polyisoprene, butyl rubber, polybutadiene, EPM rubber, EPDM rubber, or any combination thereof. Additional suitable materials may include bio-plastics such as those derived from wood pulp-based lignin (e.g., liquid wood), sugarcane or other petroleum-free moldable materials.

Different components of the case may be composed of different materials. As an example, the upper shell portion and lower shell portion may comprise different materials than the base, or keyboard insert. As previously discussed, one or more surfaces of the case (including the upper portion, lower portion and hinge portion) may include rubberized/elastomeric cap portions to prevent the case from slipping from a surface during case use. The upper portion and lower portion can be made from an ABS plastic material. Where a more pliable material is used, for example an elastomer, the upper frame may have a lip that surrounds the frame so as to be manually stretched around the corners of an electronic device to hold the device in the recessed area without additional clips, fasteners or other devices. A tactile or textured coating may be provided on the exterior of the hinge portion which provides a comfortable and sure gripping surface for a user for ease of carrying or in the many different configurations the case may be placed in.

Although the case described herein includes illustrations relating to its use with an e-reader/tablet style device such as the iPad® (available from Apple, Inc., Cupertino, Calif.), it is understood that the case can be formed in alternative sizes, shapes and configurations to serve as a case having the described features and utilities for other electronic devices such as smart phones, MP3 players, computing devices, and other popular electronic devices. The case provides increased utility and functionality by including an integrated keyboard (as illustrated, but not required), is easily manipulated to serve as an upright and secure stand for an electronic device and functions as a protective cover and travel case for everyday use and protection for portable and mobile electronic devices.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. An electronic device case comprising;
   a lower portion having a front edge, a rear edge, and two substantially parallel side edges and including an inner surface located between the edges, the inner surface having:
   i. a planar portion;
   ii. a depression portion adjacent the planar portion for receiving an insert so that upon placement of the insert within the depression portion the insert is positioned flush with the planar portion;
   wherein the planar portion is located adjacent more than one edge of the depression portion and at least one edge of the depression portion is located adjacent at least one of the side edges of the lower portion;

an upper portion connected to the lower portion, the upper portion including:
i. a frame portion having one or more edges;
ii. a recessed area for receiving an electronic device located within the confines of the frame portion;
iii. a pocket for receiving an edge of the electronic device, the pocket located substantially parallel to at least one edge of the one or more edges of the frame portion;

a hinge portion including:
i. one or more pin structures;
ii. a substantially planar front face and a substantially planar rear face opposing the front face;
iii. a first inner plate adjacent the front face for receiving an attachment means and including one or more indentations for receiving one or more pin structures;
iv. a second inner plate adjacent the rear face and opposing and attached to the first inner plate by the attachment means, the second inner plate including one or more indentations for receiving the one or more pin structures;

wherein the one or more pin structures;
i. includes a means for attaching the hinge portion to the lower portion and upper portion of the case;
ii. each includes a rounded end for placement into the indentations of the second inner plate and a substantially planar end including one or more apertures for receiving an attachment means for attaching the pin structures to the lower portion and upper portion of the case;

wherein the rounded end of one or more pin structures rotating within the indentations when the upper portion of the case is moved.

2. The case of claim 1, wherein the hinge portion includes four pin structures so that two upper pin structures are attached to the lower portion of the case and two lower pin structures are attached to the upper portion of the case.

3. The case of claim 1, wherein the rounded end of the one or more pin structures is contacted with one or more clip portions that conform to the shape of the indentations within the first and second inner plates to facilitate rotation of the one or more pin structures within the indentations.

4. The case of claim 1, wherein the attachment means for attaching the first inner plate to the second inner plate includes a plurality of screws located between the upper in structures and the lower pin structures.

5. The case of claim 1, wherein the hinge portion allows for about 360° movement of the upper portion about the hinge portion.

* * * * *